:::
United States Patent [19]
Kouremenos

[11] 3,842,618
[45] Oct. 22, 1974

[54] ABSORPTION REFRIGERATION APPARATUS OF THE INERT GAS TYPE

[75] Inventor: Demetre Kouremenos, Athens, Greece

[73] Assignee: Sarlab Aktiengesellschaft, Zurich, Switzerland

[22] Filed: Dec. 18, 1972

[21] Appl. No.: 316,385

[30] Foreign Application Priority Data
Dec. 22, 1971  Sweden.......................... 16461/71

[52] U.S. Cl.................................. 62/490, 62/491
[51] Int. Cl........................................... F25b 15/10
[58] Field of Search..................... 62/110, 490, 491

[56] References Cited
UNITED STATES PATENTS
3,516,264   6/1970   Stierlin................................ 62/101

Primary Examiner—William F. O'Dea
Assistant Examiner—Peter D. Ferguson

[57] ABSTRACT

An absorption refrigeration apparatus of the inert gas type in which the heat efficiency of an absorption refrigerator is significantly improved. The absorption refrigeration apparatus includes a vapor circulation system, a liquid circulation system, a thermo-siphon pump, and an auxiliary inert gas. Some of the heat from the vapors generated by the thermo-siphon pump is transferred to the rich absorption liquid flowing to the pump before these vapors are conducted to the condenser. The reaction column for the thermo-siphon pump has its liquid level lowered to a level below the liquid level in the absorber vessel. The above-mentioned level of reaction column is maintained during operation of the apparatus by restricting the flow of rich absorption liquid from the absorber vessel to the reaction column.

29 Claims, 8 Drawing Figures

ABSORPTION REFRIGERATION APPARATUS OF THE INERT GAS TYPE

BACKGROUND OF THE INVENTION

Known refrigeration systems of the absorption type have low heat efficiency. The principal reason for this low heat efficiency is a heat deficit in the heat exchange arrangement in the prior art refrigeration systems.

The heat deficit in the known heat exchange arrangements comes about because in the usual liquid heat exchanger, the quantity of rich absorption solution to be heated per kilogram of refrigerant vapor to be produced is greater than the quantity of the heat transmitting weak solution. Furthermore, the refrigerant vapor from the vapor expulsion unit has a considerable heat content which is not used since it dissipates to the surrounding atmosphere. In the past, various attempts have been made to equalize the differences in the various heat contents present in the known systems. Theoretically, this can be achieved by conducting the refrigerant vapor, after it has been rectified to the boiling point of the rich solution, countercurrent to the rich liquid flowing from the heat exchanger to the vapor expulsion unit or generator. This arrangement results in a highly improved heat efficiency.

In practice, however, the foregoing arrangement cannot be applied to small refrigerating apparatus, such as household refrigerators, which operate with a thermosiphon pump. This pump can be connected to a liquid circulation system only at such a point in the system where the rich solution has reached its boiling point. Moreover, it is difficult to conduct the vapors generated from the vapor expulsion unit through a conduit below the liquid level in the absorber vessel, and to have the condensate formed in this conduit properly discharged back into the liquid circulation system of the apparatus. If, in order to overcome this difficulty, the heat recovery part of the vapor expulsion unit was placed at a level above the absorber vessel and a direct connection made between the absorber vessel and the vapor expulsion unit, the absorber vessel itself is not incorporated in the liquid conduit. Therefore, the shifting of concentrations occurring in the liquid circuit impairs the function and reliable operation of the device.

The prior art constructions have not been able to produce a vapor expulsion unit or generator device with improved heat efficiency that is suitable for use in a small absorption refrigeration apparatus.

SUMMARY OF THE INVENTION

The present invention relates to an absorption refrigeration apparatus of the inert gas type in which the heat efficiency of the system is improved significantly.

It is a principal object of the present invention to provide an absorption refrigeration apparatus of the inert gas type which results in improved heat efficiency and reliable operation, and which utilizes the well-known triple heat exchanger arrangement.

Another object of the present invention is to achieve improved heat efficiency in the system by lowering the liquid level in the reaction column for the liquid circulation pump to a level below the liquid level in the absorber vessel and maintaining the reaction head in the reaction column during operation of the apparatus by restricting the flow of rich absorption solution from the absorber vessel to the reaction column.

It is another object of the present invention to provide a novel heat exchanger which is constructed so that the conduits, in operation, contain a stable two-phase film flow without vapors bubbling through the liquid.

It is a further object of the present invention to provide a parallel arrangement of the conduits forming the novel heat exchanger. In the alternative, the conduits may be coaxially arranged or wound in a coil form.

The invention will now be more fully described with reference to the accompanying drawings wherein.

DESCRIPTION OF THE PREFERRED EMBODIMENTS

The absorption refrigerating apparatus disclosed herein contains an absorption solution, for example water, a refrigerant, such as ammonia, and an inert pressure equalizing gas, such as hydrogen.

Figure 1:
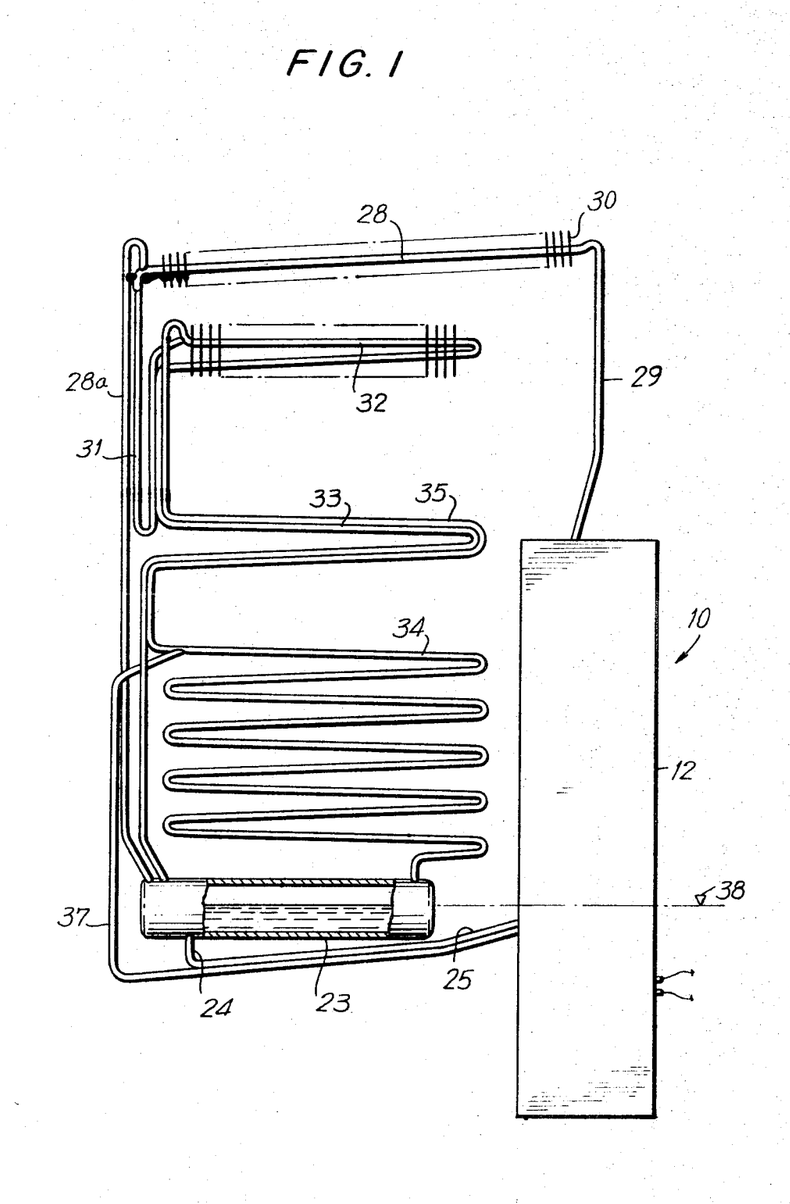
FIG. 1 is a diagrammatic view of the entire absorption refrigerating apparatus constructed in accordance with the teachings of my present invention.
Figure 2:
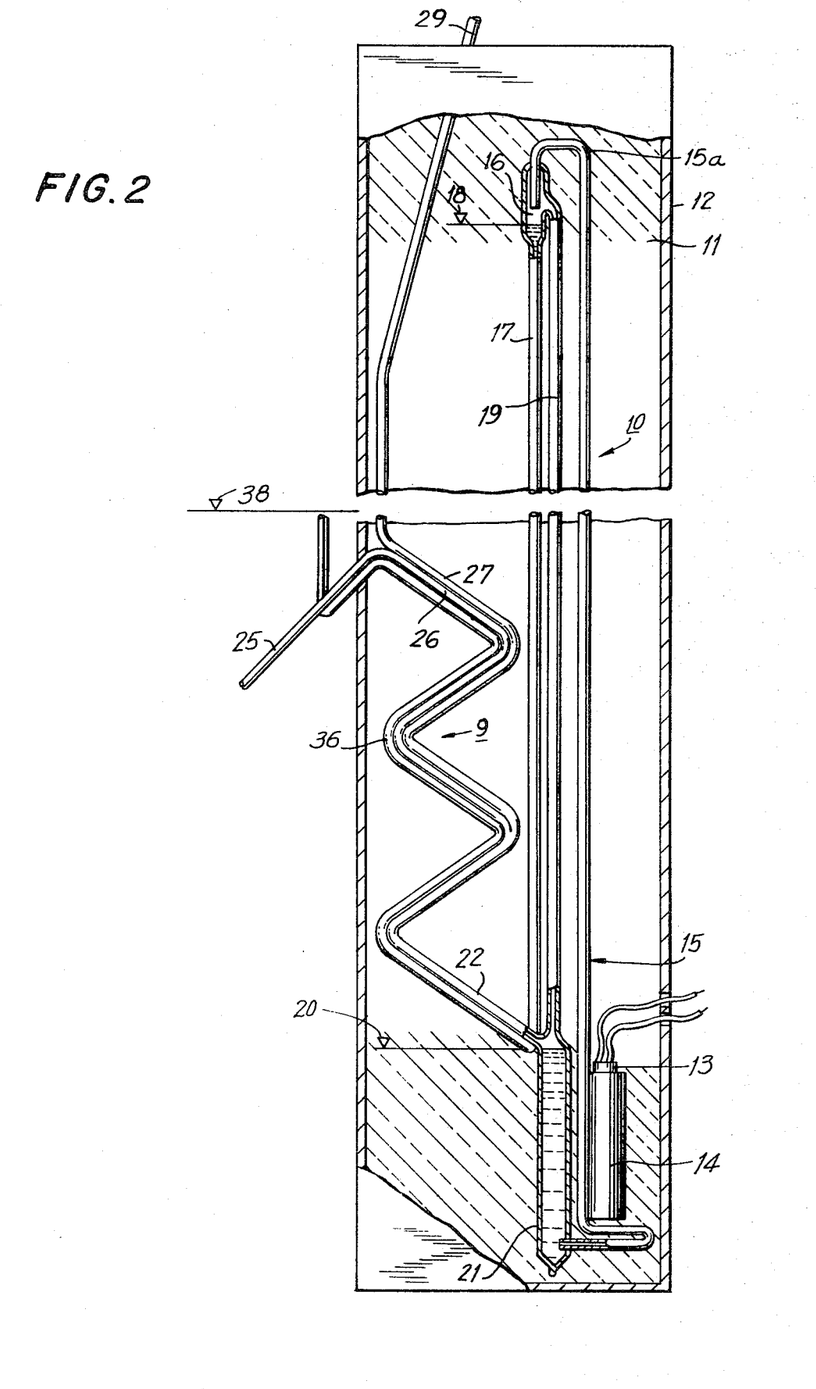
FIG. 2 is a vertical sectional view of the vapor expulsion unit or generator of the apparatus.

As seen in FIGS. 1 and 2, the present absorption refrigerating apparatus comprises a vapor expulsion and liquid circulation unit 10 which is mounted in a housing 12 having a heat insulation 11. Heat is supplied to the vapor expulsion unit or generator 10 by a heat source, for example an electric heating cartridge 13 encased in a metal sleeve 14. The cartridge and its heat conducting sleeve are positioned in heat-conducting relationship with a heat-operated thermo-siphon pump 15. The pipe 15a of the pump 15 opens into a vapor space 16 having another pipe 17 connected to the bottom end thereof. Thus, the liquid lifted by the pump is collected in the pipe 17 below the liquid surface level 18, and the vapors carried to the vapor space 16 are conducted down through the conduit 19 which is connected to the vapor space 16 at a point intermediate between the bottom and top thereof, and above the liquid surface level 18. The bottom of the conduit 19 is connected to a liquid column in a pipe 21 that contains liquid to a liquid surface level 20, the liquid column being a rich absorption solution that serves as a reaction head for the pump 15. It should be noted that the pipe 21 with its reaction column is provided with a larger cross-section than the vapor conduit 19 in order to hold a sufficient quantity of liquid, thereby preventing fluctuations in the liquid level 20 during operation of the apparatus.

Figure 3:
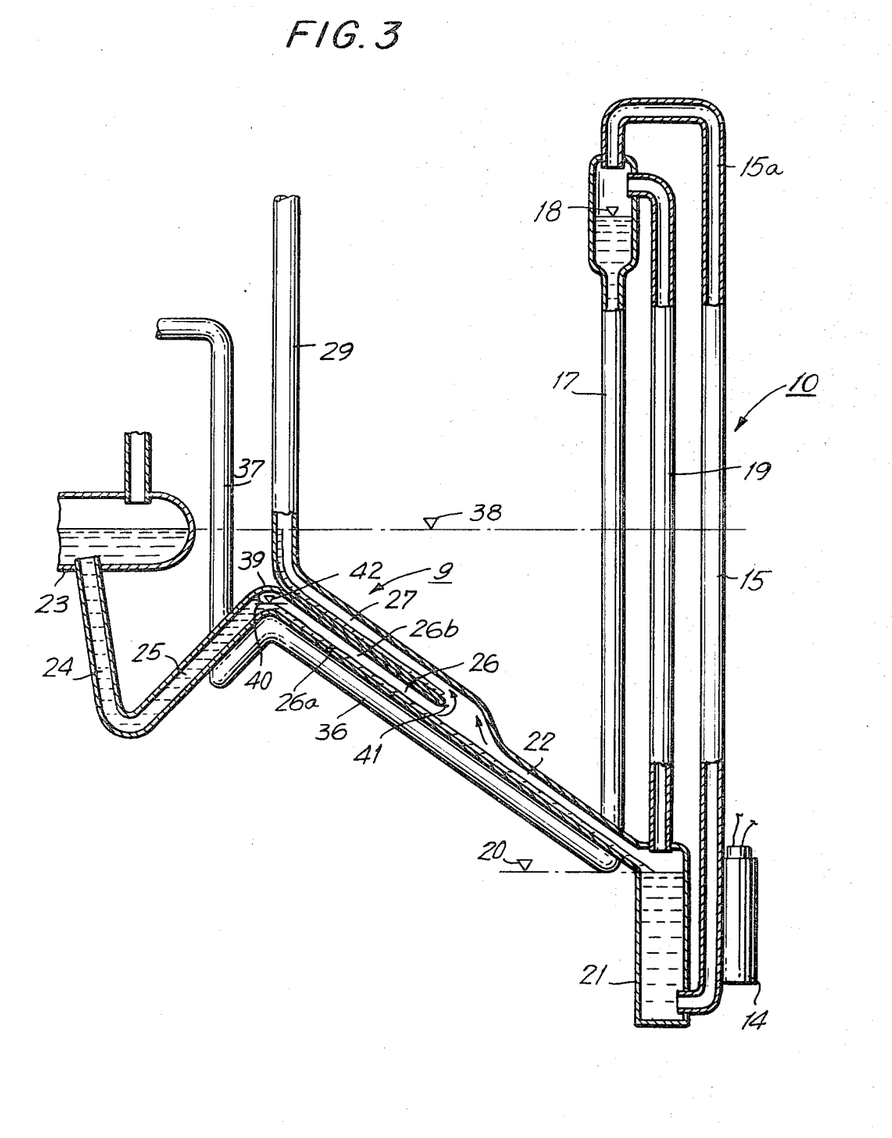
FIG. 3 is a schematic view, on a larger scale, of the liquid circulation system including the novel heat exchanger construction shown in FIG. 2.

As seen in FIGS. 2 and 3, the vapors passing through the conduit 19 flow up through conduit 22 of a heat exchanger 9 in countercurrent to the rich absorption solution flowing to the vapor expulsion unit or generator 10 from the absorber vessel 23. FIG. 3 shows the absorber vessel 23 being connected to the generator 10 through a conduit 24 in the form of an upturned knee or an inverted V in which liquid flows upwardly in one leg 25 and flows downwardly in the other leg 26 to the reaction column 21. Another conduit 27 of the heat exchanger 9 is illustrated in heat conducting relationship with the leg 26 through which the vapors from the conduit 22 flow and consequently pass through the vapor conduit 29 to the condenser 28. Water separated from the vapors in conduits 29 and 27 flows back through the conduit 22 to the liquid column in pipe 21.

The outlet end of condenser 28 is connected by a conduit 28a to the absorber vessel 23 so that any inert gas which may pass through the condenser 28 can flow into the top of the absorber vessel 23.

The condenser 28 is further provided with fins 30 and the vapor which is present therein is liquified and flows through the condensate conduit 31 to the evaporator 32. The condensate evaporates in the evaporator 32 during the generation of cold and diffuses into the inert gas, such as hydrogen, circulating through the evaporator 32, the absorber 34 and conduit 35 back to the evaporator 32. Furthermore, the interengaging conduits 33 and 35 form a gas heat exchanger.

The weak absorption solution collected in pipe 17 flows through a conduit 36 (FIG. 3) which is arranged in heat-conducting relationship with the conduits 25 and 26 containing the rich absorption solution. The weak absorption solution passing through pipe 17 is connected to a pipe 37 that is in turn connected to the top of absorber 34. This arrangement causes the weak absorption solution to pass down through the absorber 34 to the absorber vessel 23 and consequently absorbing ammonia from the rich gas mixture flowing upwardly through the absorber 34.

From the foregoing description, it should be apparent that the different liquid levels in the apparatus must be maintained in the present liquid circulation system. In this regard a first liquid surface level 38 is upheld in the absorber vessel 23 which contains rich absorption solution. A second liquid surface level 20 is located in the reaction column formed in the pipe 21 and a third liquid surface level 18 is in the standpipe 17 and constitutes a weak liquid. With the liquid levels in mind, my invention will be more particularly described with reference to FIG. 3 in which both conduit legs 25 and 26 form an upturned knee or inverted V, having a common highest point 39 at the connecting juncture which is located below the first liquid level 38 in the absorber vessel 23. In the inverted V, the conduit leg 26 provides a descending portion and conduit leg 25 provides an ascending portion. In the construction a gas bubble 40 formed mainly of the inert gas in the system, and originally dissolved and later expelled from the rich absorption solution upon heating, remains trapped in the descending portion formed by the conduit leg 26 with one end located close to the highest point 39 and extending downwardly therefrom. The gas bubble 40 is a stagnant body of vapor which functions as a gas blanket and makes the vapor solution unit or generator 10 function properly by forming a restriction to the flow of rich absorption solution in the conduit leg 26 so that, during normal operation of the apparatus, the second liquid surface level 20 of the rich absorption solution is maintained in the system.

The rich absorption solution, during passage from the absorber vessel 23 to the generator unit 10, is heated by vapors flowing through the conduit 27 and by the weak solution flowing in the conduit 36. The rich absorption solution reaches its boiling point at the region 41 where the vapors are diverted through the conduit 27. Thereafter, the solution flows at boiling temperature downwards in the conduit or rectifier 22 in counter-current to the vapor from the vapor generator and into the pipe 21 forming the reaction head for the thermo-siphon pump 15. It should be noted that both the vapor and the weak absorption solution give up part of their heat content to the rich absorption solution.

The operation of the liquid circulation system of my apparatus is as follows: At start up, when the apparatus is cold, the heating is initiated and all parts of the apparatus situated below the first liquid surface level 38 in the absorber vessel 23, which includes the conduit legs 25 and 26 of the inverted V are filled with liquid. When heat is applied, the thermo-siphon pump 15 commences to deliver vapors so that the liquid column in the conduit 19 descends to the liquid surface level 20 whereby vapors can pass into the rectifier 22. It should be pointed out that at the beginning of operation of the apparatus the rectifier 22 is filled with liquid and the vapors generated by the pump 15 have to bubble through the liquid in order to be transported to the condenser 28. At the region 41, a small part of the vapor goes into the conduit leg 26 while the remainder of the vapor moves into the water separator conduit 27.

The portion of the vapor that finds its way into the conduit leg 26 is absorbed by the cold, rich absorption solution. After the apparatus has been operating for a short period of time, the liquid in the conduit leg 26 reaches a sufficiently high temperature so as not to absorb all the vapor entering the conduit. Because of the vapor bubbling through the rectifier 22, the vapor expulsion unit 10 does not work steadily during the starting period and does not reach the same low vapor exit temperature and high coefficient of performance as later when normal operating conditions prevail.

After a certain period of operation of the apparatus, the exact time depending upon the thermal capacity of the vapor expulsion unit 10, the inert gas dissolved in the rich absorption solution and expelled from the vapor expulsion unit reaches the highest point 39 of the inverted V-shaped conduit legs 25 and 26 and forms a non-condensable gas bubble at this point. Thereafter, the stable operation of the vapor expulsion unit is accomplished and also a high coefficient of performance of the unit is achieved. Once the gas bubble 40 is formed, it does not disappear but remains in the system even if the heat input to the vapor expulsion unit is switched off.

It should be apparent that generally stagnant gas bubbles in the liquid conduits of prior art absorption refrigeration apparatus were not desired since difficulties arose in the operation of the apparatus if the gas bubbles were present. Special precautions were taken heretofore to avoid the appearance of gas bubbles in the system. However, in the present construction, the gas bubble 40 is desirable since it makes it possible to achieve a high efficiency operation of an absorption refrigerating apparatus. Since the gas bubble 40 is used for the purpose of flow restriction the liquid surface level 42 at the region near the highest point 39 in the conduit leg 25 can be maintained below the liquid surface level 38 of the absorber vessel 23.

In the state of steady operation of the apparatus, the gas bubble 40 consists principally of inert gas, such as hydrogen, but it also contains some refrigerant vapor with such a partial pressure as is required to stay in equilibrium with the solution at the same location in the conduit.

In the steady operation of the apparatus, the conduits 26, 22, and 27 contain a stable, two-phase film flow without vapors bubbling through the liquid. A continuous interface is established between gaseous fluid and liquid in passageways 26, 22 and 27 of heat exchanger 9, whereby two-phase film flow is achieved by means such as the slope of the conduits, spiral wires or grooves in the conduits, for example, and further by the restriction of the rich absorption liquid flow by means of the gas bubble 40. This film flow is of importance in order to achieve a high coefficient of performance, since, on the other hand, the bubbling of gas through liquid causes the mixing of liquids having different concentrations of refrigerant.

The various conduits passageways incorporated in the heat exchanger 9 are shown in FIG. 3 in a single plane parallel arrangement in order to illustrate the flow paths of the operating media. In practice however, the above-mentioned conduits may be arranged differently, for example, as shown in FIGS. 4–7, which may be more practical forms of the invention.

The length of the conduit 26 for the rich absorption solution in the heat exchanger may be only sufficient to bring about the boiling point of the rich absorption liquid at the region 41. However, the conduit 26 can extend, for example, as far as to the entrance to the pipe 21. Such an arrangement is thermodynamically equivalent to the construction shown in FIG. 3 and hereinabove described. However, if it is preferred to have the heat exchanger pipes wound in a coil then conduit leg 26 can extend to the pipe member 21.

Figures 4, 4A, 5:
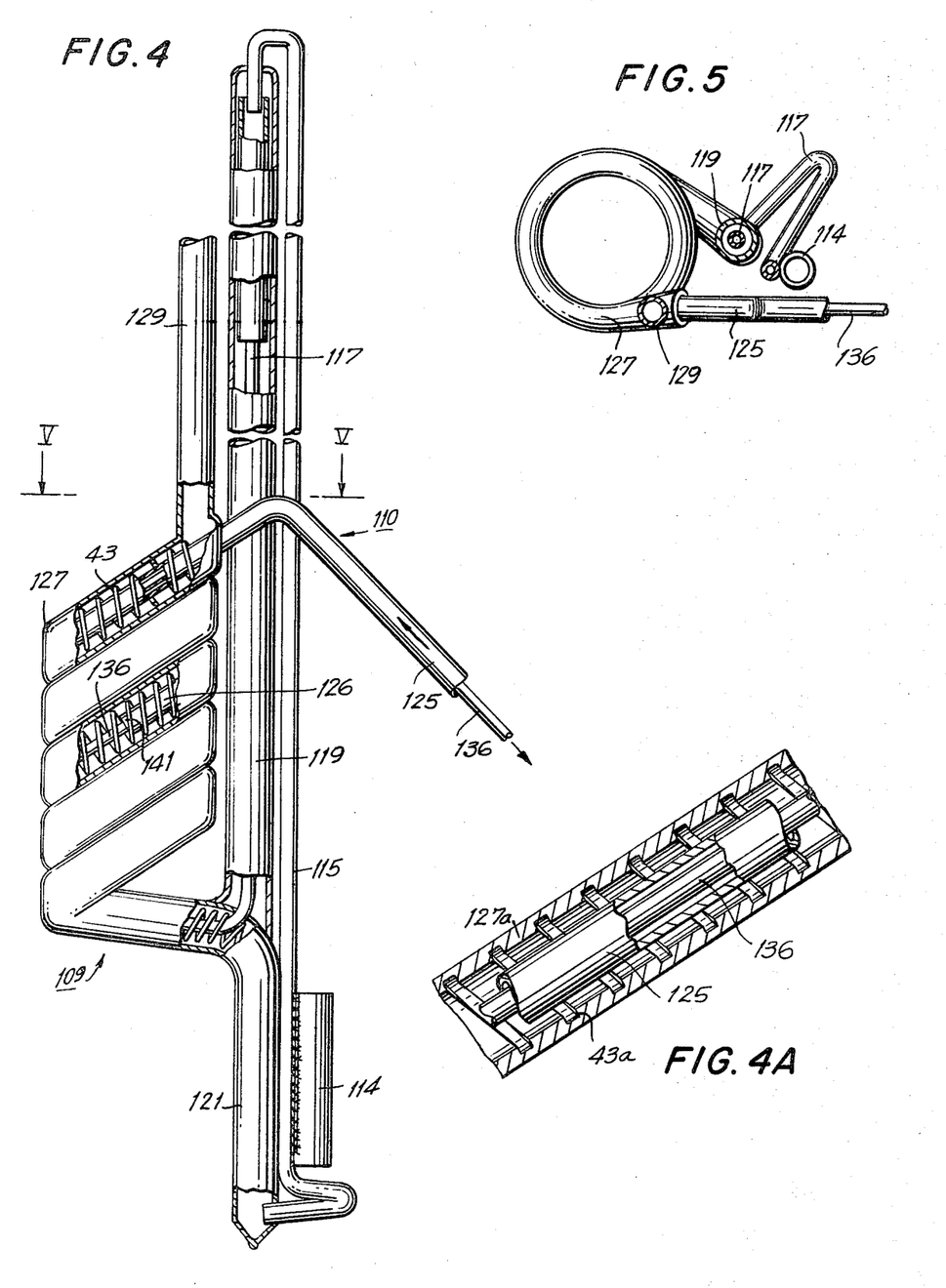
FIG. 4 is a modification of the vapor expulsion unit and liquid heat exchanger shown in FIG. 3 in which the latter is coiled.
FIG. 4A is a fragmentary view of a liquid heat exchanger like that shown in FIG. 4 illustrating a modification of the invention.
FIG. 5 is a sectional view of FIG. 4 taken along the lines V—V of FIG. 4.

FIGS. 4 and 5 show an arrangement in which the conduit 117 for the weak absorption solution is positioned concentrically inside the vapor conduit 119 and enters into a coiled heat exchanger 109 at the lowest point thereof. As seen, the heat exchanger 109 comprises concentrically arranged conduits. In this construction, the weak absorption solution passes from the standpipe 117 through the inner conduit 136, and the rich absorption solution flows from the absorber vessel through the ascending leg 125 of the inverted V into the descending coiled leg 126 which opens into the outer conduit 127 at the region 141. In order to reduce the rate of flow of heated gaseous fluid or vapor formed in generator 110 and flowing through the heat exchanger 109 to the condenser (28 in FIG. 1), the inner surface of the piping 127, both below and above the region 141 at which the lower end of piping 126 terminates, is provided with a wire 43 of helical form which extends axially of the piping 127. By reducing the rate of flow of heated gaseous fluid in this manner the heat exchange with liquid formed and flowing in the piping 126 and rich absorption solution flowing in the piping 127 below the region 141 is improved. Further, the helical wire 43 functions to insure a continuous interface between gaseous fluid and liquid to promote two-phase film flow, as explained above.

Instead of employing a helical wire, as shown in FIG. 4, grooving 43a may be provided at the inner surface of piping 127a, as shown in FIG. 4A. The piping 127a in FIG. 4A corresponds to piping 127 in FIG. 4. The grooving 43a reduces the rate of flow of heated gaseous fluid and functions in the same manner as the spiral wire 43 in FIG. 4, as explained above.

Figure 6:
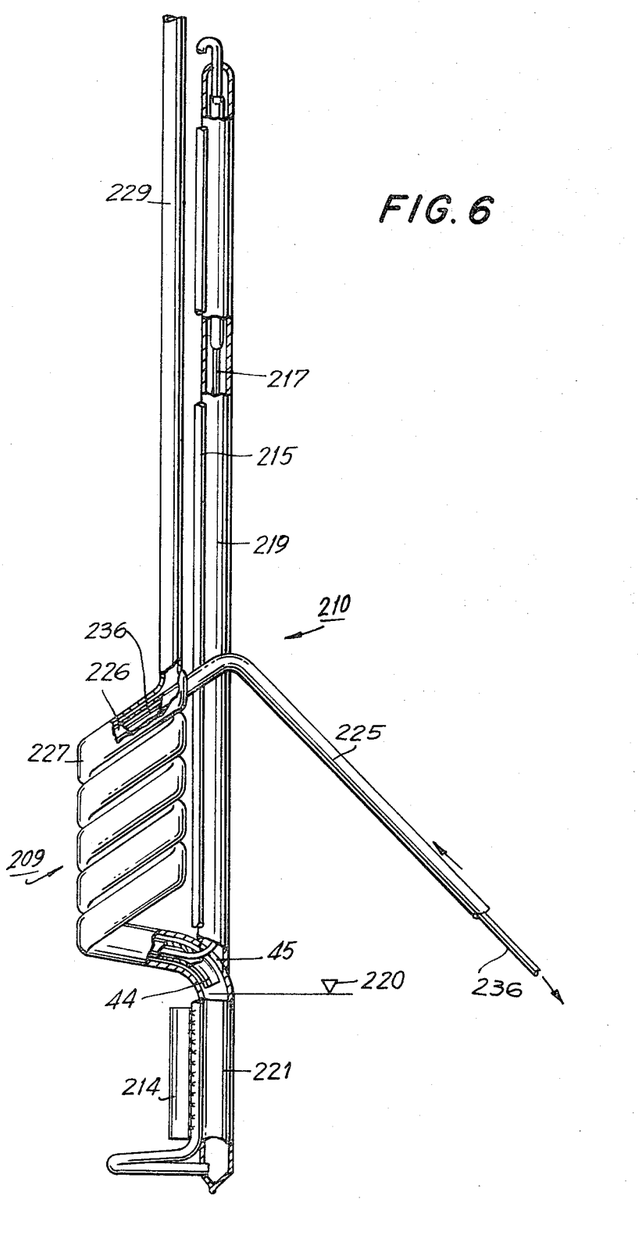
FIG. 6 is another modification of the vapor expulsion unit and liquid heat exchanger shown in FIG. 3 but similar to that shown in FIG. 4.

Referring to FIG. 6, the metal sleeve 214 for the electric heating cartridge is shown abutting the heat operated thermo-siphon pump 215. The conduit 217 for the weak absorption solution is located concentrically inside the vapor conduit 219 and the solution passes through the inner conduit 236 while the rich absorption solution flows from the absorber vessel through the leg 225 into the coiled leg 226 which opens into the outer conduit 227. The vapors flow from outer conduit 227 through conduit 229 to the condenser 28.

The construction shown in FIG. 6 is similar to that shown in FIGS. 4 and 5 with the exception that the conduit 225, 226 for the rich absorption solution extends down to a point 44 between the level 220 in the pipe 221 and a point 45 in which vapors for the conduit 219 flow over into the conduit 227 in the heat exchanger.

Figure 7:
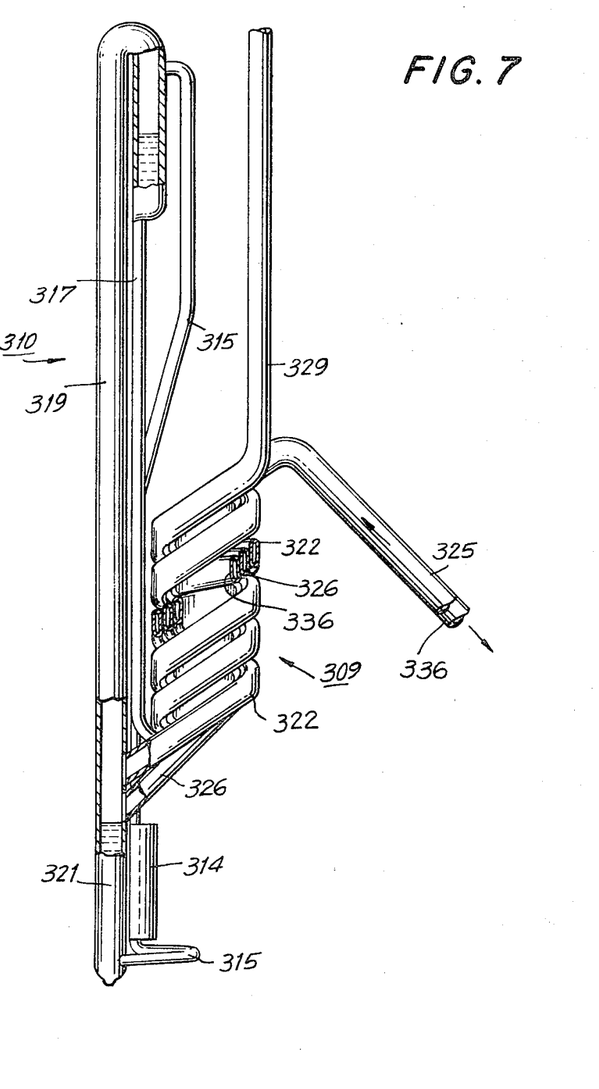
FIG. 7 is a further modification of the vapor expulsion unit and liquid heat exchanger shown in FIG. 3 in which the latter is coiled but the conduit is constituted of flattened sections.

FIG. 7 shows another embodiment of the invention having a rich absorption solution conduit in the heat exchanger extending down to a point close to the liquid surface level in the pipe 321 containing the reaction head for the pump 315. The unit illustrated in FIG. 7 is heated by a heat conducting sleeve 314 which is in heat conducting relationship with the pump 315. The latter generates vapors and lifts liquid to the standpipe 317 while the vapors are separated from the liquid and flow down the conduit 319 forming the upper part of pipe 321 holding the reaction head for the pump 315. The vapors from the conduit 319 flow into the conduit 322 that constitutes a plurality of flattened pipes which are wound in a coil together with the conduit 326 for rich absorption solution and the conduit 336 for weak absorption solution, the latter conduit being connected to the standpipe 317.

It should be noted that the vapor expulsion unit 310 can be operated with either an electric heating cartridge 313, as seen in FIGS. 1 and 2, or with a gas or oil burner. As the temperature of the vapors is lowered to a very low value in the heat exchanger, it is desirable to heat insulate the vapor conduit 329 in order to prevent the refrigerant vapor from condensing therein.

In FIG. 1 the absorber 34 provides an elongated path of flow for absorption solution and the absorber vessel 23 receives solution from the elongated path. In FIG. 3 the heat exchanger 9 is disposed at a level lower than the liquid surface level 38 in the absorber vessel 23. The absorption solution circuit comprises conduit means including a first heat exchanger passageway 26, 22 and the path 21 for conducting solution rich in refrigerant from the absorber vessel 23 to the generator 10. The vapor line for conducting heated gaseous fluid from the generator 10 to the condenser 28 includes at least one of the heat exchanger passageways 22, 27 for transferring heat to rich absorption solution.

As explained above, a section 26 of the rich absorption liquid conduit means 24, 25, 26 and 22 is constructed and formed to receive gaseous fluid diverted from the vapor line 22, 27 and to produce therein during normal operation of the system a gaseous obstruction 40 responsive to receiving such gaseous fluid for restricting flow of rich absorption solution from the absorber vessel 23 to the part 21 sufficiently to lower the liquid surface of the liquid column in the part 21 to a level lower than the liquid surface 38 in the absorber vessel 23 and maintain the reaction head for the pump 15.

As seen in FIG. 3 the rich absorption solution conduit means 24, 25, 26 includes ascending and descending portions and a connection 39 therebetween at which region rich absorption solution sharply changes its direction of flow and starts flowing downward in the descending portion 26 after flowing upward in the ascending portion 25.

The gaseous obstruction is formed by a gas bubble 40 which also may be referred to as a gas blanket which is at the ceiling of the conduit means section 26 and overlies rich absorption solution therein to form a continuous interface at the juncture or boundary between gas at 26a and liquid at 26b. This promotes two-phase film flow which is characterized by the absence of gaseous fluid bubbling through liquid. Such two-phase film flow also takes place in heat exchanger passageways 22 and 27, as pointed out above.

What is claimed is:

1. In an absorption refrigeration system employing an inert gas as a pressure equalizing agent,
   a. a circuit for circulation of absorption solution including a generator and an absorber and a heat exchanger therebetween having several passageways,
   b. said generator including a pump for raising liquid by vapor-liquid lift action with vapor expelled from solution by heating to circulate solution in said circuit,
   c. a part in said circuit for holding a column of solution,
   d. the solution being raised in said pump under the influence of a reaction head formed by the column of liquid in said part,
   e. said absorber including means providing an elongated path of flow for absorption solution and a vessel which receives solution from the elongated path,
   f. said heat exchanger being disposed at a level lower than the liquid surface level in said absorber vessel,
   g. said circuit comprising conduit means including a first heat exchanger passageway and said part for conducting absorption solution rich in refrigerant from said absorber vessel to said generator,
   h. a condenser,
   i. a vapor line for conducting from said generator to said condenser gaseous fluid including inert gas and vapor expelled at an elevated temperature from solution at said generator,
   j. said vapor line including at least one of said heat exchanger passageways for transferring heat to rich absorption solution, and
   k. means comprising a section of said conduit means constructed and formed to receive gaseous fluid diverted from said vapor line and to produce therein during normal operation of the system a gaseous obstruction responsive to receiving such gaseous fluid for restricting flow of rich absorption solution for said absorber vessel to said part sufficiently to lower the liquid surface of the liquid column in said part to a level lower than the liquid surface in said absorber vessel and maintain the reaction head for said pump.

2. In an absorption refrigeration system as set forth in claim 1 in which the gaseous obstruction is formed by a gas bubble which overlies rich absorption solution in said section of said conduit means to form a continuous interface therebetween.

3. In an absorption refrigeration system as set forth in claim 1 in which said section of said conduit means includes a region having a high point toward and from which rich absorption solution is conducted, the gaseous obstruction being formed by a gas blanket which is at the ceiling of said section of said conduit means and overlies rich absorption solution therein to form a continuous interface therebetween, said gas blanket functioning to maintain the liquid surface at said region at a level lower than the liquid surface at said absorber vessel.

4. In an absorption refrigeration system as set forth in claim 1 in which
   a. the gaseous fluid produced at said generator for flow through said vapor line and diverted into said section of said rich absorption solution conduit means initially comprises inert gas and vapor expelled from solution by heating when the system is initially started,
   b. the gaseous fluid in said section of said rich absorption solution conduit means comprising principally a body of inert gas when normal operation of the system is established, such body of inert gas forming a stagnant gas bubble serving as the gaseous obstruction.

5. In an absorption refrigeration system as set forth in claim 1 in which
   a. at least a portion of said first heat exchanger passageway comprises said one of said heat exchanger passageways, whereby said portion of said first heat exchanger passageway provides a common path of flow for rich absorption solution in said conduit means and for gaseous fluid in said vapor line,
   b. said first heat exchanger passageway being so constructed and arranged that rich absorption solution and gaseous fluid flow therein in heat exchange relation with respect to one another in said common path of flow with the gaseous fluid overlying the rich absorption solution.

6. In an absorption system as set forth in claim 5 in which, in said common path of flow provided by said portion of said first heat exchanger passageway, the gaseous fluid overlies the rich absorption solution to form a continuous interface therebetween to promote two-phase film flow characterized by the absence of gaseous fluid bubbling through liquid.

7. An absorption refrigeration system as set forth in claim 1 in which at least said one heat exchanger passageway of said vapor line comprises one portion of said first heat exchanger passageway and gaseous fluid is diverted from said one portion to another portion of said first heat exchanger passageway that does not form a part of said vapor line.

8. An absorption refrigeration system as set forth in claim 1 in which
   a. at least a first portion of said first heat exchanger passageway comprises said one of said heat exchanger passageways, whereby said first portion of said first heat exchanger passageway provides a common path of flow for rich absorption solution in said conduit means and for gaseous fluid in said vapor line, and b. a second heat exchanger passageway forming a part of said vapor line and into which gaseous fluid flows from the first portion of said first heat exchanger passageway serving as a common path of flow for rich absorption solution and gaseous fluid, c. the gaseous fluid in said second heat exchanger passageway being in heat exchange relation and out of physical contact with rich absorption solution in a second portion of said first heat exchanger passageway forming a part of said section of said conduit means that receives gaseous fluid diverted from said vapor line.

9. An absorption refrigeration system as set forth in claim 8 in which the gaseous fluid in said vapor line flows into said second heat exchanger passageway from a region of the first portion of said first heat exchanger passageway at which the rich absorption solution conducted from said absorber vessel to said generator is at an elevated temperature approaching its boiling point.

10. An absorption refrigeration system as set forth in claim 8 in which, during normal operation thereof, the gaseous fluid in said second gas heat exchanger passageway overlies liquid therein to form a continuous interface therein to promote two-phase film flow.

11. An absorption refrigeration system as set forth in claim 8 in which, during normal operation thereof, the gaseous fluid in said first and second portions of said first heat exchanger passageway and in said second heat exchanger passageway, overlies liquid in these parts to form an interface therebetween to promote two-phase film flow characterized by the absence of gaseous fluid bubbling through liquid.

12. An absorption refrigeration system as set forth in claim 1 in which said conduit means includes ascending and descending portions and a connection therebetween at which region rich absorption solution sharply changes its direction of flow and starts flowing downward in the descending portion after flowing upward in the ascending portion, at least said section of said conduit means comprising said descending portion.

13. An absorption refrigeration system as set forth in claim 12 in which said conduit means section is of inverted V-shape.

14. An absorption refrigeration system as set forth in claim 12 in which said descending portion of said conduit means section comprises at least a part of said first heat exchanger passageway.

15. An absorption refrigeration system as set forth in claim 12 in which at least said one heat exchanger passageway of said vapor line has a region intermediate its ends in open communication with the descending portion of said conduit means section comprising said first heat exchanger passageway, whereby gaseous fluid is diverted from said vapor line to the descending portion of said conduit means section in a direction toward the connection at its upper end.

16. An absorption refrigeration system as set forth in claim 12 in which a. at least said one heat exchanger passageway of said vapor line comprises at least a part of said first heat exchanger passageway and a second heat exchanger passageway, b. said second heat exchanger passageway being in open communication with said first heat exchanger passageway for rich absorption solution but not forming a part thereof, whereby the descending portion of said conduit means section and connection at its upper end are exposed to gaseous fluid flowing from said generator to said condenser at the open communication of said second heat exchanger passageway to said first heat exchanger passageway.

17. An absorption refrigeration system as set forth in claim 16 in which said second heat exchanger passageway is in open communication with said first heat exchanger passageway for rich absorption solution at a region of said first heat exchanger passageway at which the rich absorption solution conducted from said absorber vessel to said generator is at an elevated temperature approaching its boiling point.

18. An absorption refrigeration system as set forth in claim 1 in which a. said heat exchanger comprises first vertically disposed piping and second vertically disposed piping of smaller cross-sectional area extending axially through the upper part of said first piping and at its lower end terminating at a region between the top and bottom ends of said first piping, b. said first heat exchanger passageway of said conduit means comprising said second piping and the part of said first piping extending downward from the lower end of said second piping, and c. said vapor line comprising the part of said first piping extending downward from the lower end of said second piping and the annular space between said first piping and said second piping.

19. An absorption refrigeration system as set forth in claim 18 in which said first piping and second piping comprise vertically disposed coils.

20. An absorption refrigeration system as set forth in claim 19 in which said circuit comprises means for conducting absorption solution weak in refrigerant from said generator to said absorber, said last-mentioned means comprising third piping of smaller cross-sectional area than said second piping, and said third piping comprising a coil having one part extending axially through said second piping and another part extending axially through that part of said first piping extending downward from the lower end of said second piping.

21. An absorption refrigeration system as set forth in claim 18 which includes means at the inner surface of said first piping to reduce the rate of flow of gaseous fluid in said vapor line from said generator to said condenser to improve heat exchange with rich absorption solution in said first heat exchange passageway.

22. An absorption refrigeration system as set forth in claim 21 in which said means at the inner surface of said first piping comprises a wire of helical form extending axially of said first piping.

23. An absorption refrigeration system as set forth in claim 21 in which said means at the inner surface of said first piping comprises grooving extending axially of said first piping.

24. An absorption refrigeration system as set forth in claim 21 in which a. said heat exchanger is vertically disposed and comprises first piping having vertical extent and second piping having vertical extent and of smaller cross-sectional area than said first piping, b. the lower end of said first piping being connected to the upper end of said part, c. said second piping extending axially through said first piping and at its lower end terminating in the vapor space of said part at a region above the liquid surface level therein, d. said first piping at its lower end being connected to receive gaseous fluid from said generator at a region thereof which is above the lower end of said first piping, e. said first heat exhanger passageway of said conduit means comprising said second piping, f. said vapor line comprising the annular space between said first piping and said second piping, and g. said section of said conduit means comprising said second piping which, at its lower end, receives gaseous fluid diverted from the annular space between said first piping and said second piping.

25. An absorption refrigeration system as set forth in claim 24 in which said first piping and said second piping comprise vertically disposed coils.

26. An absorption refrigeration system as set forth in claim 25 in which said circuit comprises means for conducting absorption solution weak in refrigerant from said generator to said absorber, said last-mentioned means comprising third piping of smaller cross-sectional area than said second piping, and said third piping comprising a coil extending axially upward through said second piping substantially from the region of said first piping at which the latter is connected to receive gaseous fluid from said generator.

27. An absorption refrigeration system as set forth in claim 1 in which a. said generator includes a vertical conduit having its upper end connected to the upper end of said pump pipe and its lower end connected to said part, the expelled vapor separated from raised liquid at the upper end of said pump flowing downward in said vertical conduit, b. said heat exchanger being vertically disposed and comprising first, second and third piping sections which form said heat exchanger passageways, c. said vapor line comprising said first piping section which, at its lower end, is in communication with said conduit, d. said first heat exchanger passageway comprising said second piping section which, at its lower end, is in communication with said part above the liquid surface level therein, e. said circuit comprising means for conducting absorption solution weak in refrigerant from said generator to said absorber, said last-mentioned means comprising said third piping section, and f. each of said piping sections comprising a vertically disposed coil, said coils being heat conductively connected to one another along their lengths.

28. An absorption refrigeration system as set forth in claim 27 in which a. each of said piping sections comprises piping which is flattened with long opposing sidewalls and short connecting end walls, b. said coils being formed from said piping sections with said long sidewalls vertically disposed, and c. said coils being heat conductively connected to one another along their lengths at their long sidewalls.

29. An absorption refrigeration system as set forth in claim 1 in which a. said heat exchanger has at least a pair of passageways substantially co-extensive with one another, b. one of said co-extensive passageways comprising said one heat exchanger passageway forming a part of said vapor line, a region at the lower end of said one co-extensive passageway being connected to receive heated gaseous fluid from said generator, c. the other of said co-extensive passageways comprising said first heat exchanger passageway forming a part of said rich absorption solution conduit means, and d. said section of said conduit means comprising said other co-extensive passageway which is constructed and formed to receive gaseous fluid diverted into the lower end thereof from said vapor line at said region.

* * * * *

UNITED STATES PATENT OFFICE
CERTIFICATE OF CORRECTION

Patent No. 3,842,618　　　　　　　　　Dated October 22, 1974

Inventor(s) DEMETRE KOUREMENOS　　　　　Page 1 of 4

It is certified that error appears in the above-identified patent and that said Letters Patent are hereby corrected as shown below:

Substitute new Figs. 4, 4A, 5, 6 and 7 for the original figures appearing on three sheets of drawings as originally filed.

Signed and Sealed this

*twenty-seventh* Day of *April 1976*

[SEAL]

*Attest:*

RUTH C. MASON　　　　　　　　C. MARSHALL DANN
*Attesting Officer*　　　　　　*Commissioner of Patents and Trademarks*

Patent No. 3,842,618